March 4, 1958  E. A. QUADE  2,825,859
POSITIONING MECHANISM OF THE SERVO TYPE
Filed Dec. 24, 1956
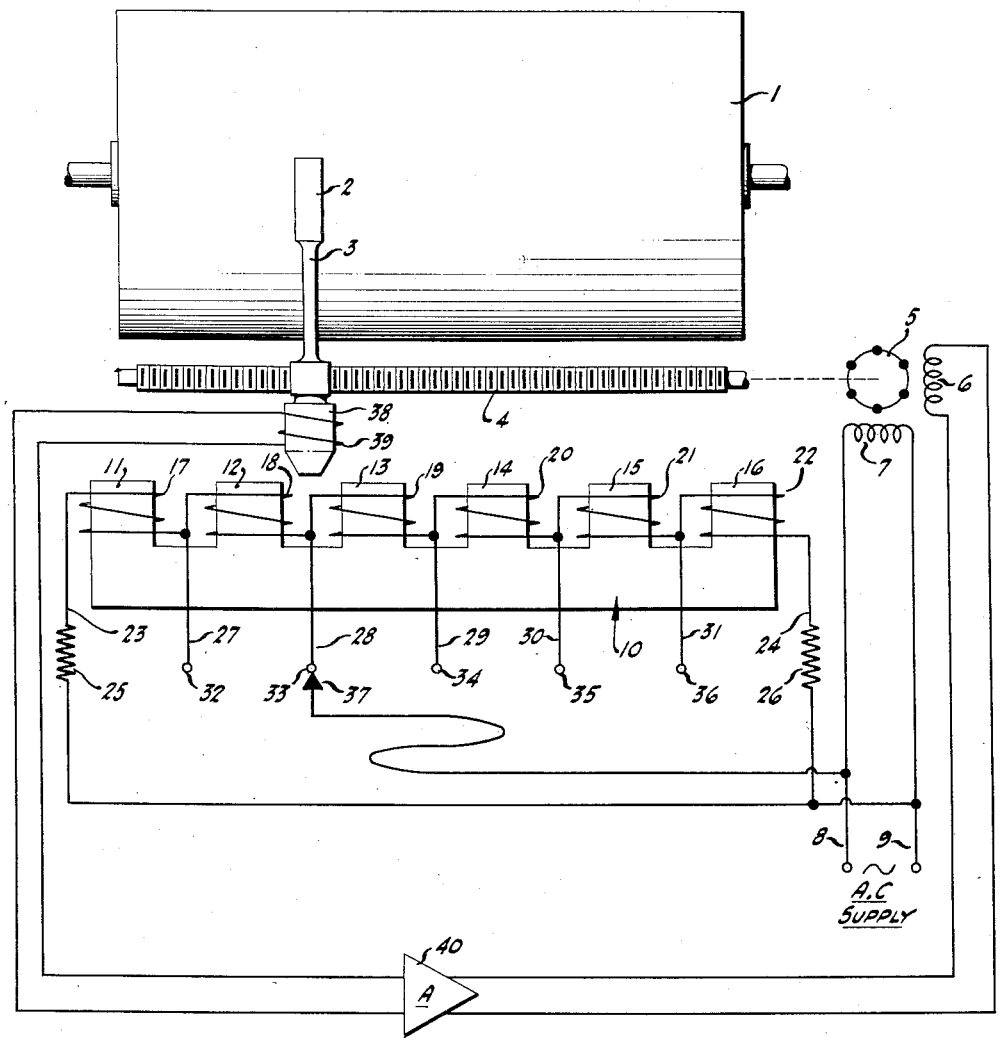
INVENTOR.
EDWARD A. QUADE
BY
*Lippincott & Smith*
ATTORNEYS

United States Patent Office

2,825,859
Patented Mar. 4, 1958

2,825,859

POSITIONING MECHANISM OF THE SERVO TYPE

Edward A. Quade, San Jose, Calif., assignor to International Business Machines Corporation, New York, N. Y., a corporation of New York Application December 24, 1956, Serial No. 630,411

2 Claims. (Cl. 318—28)

This invention relates to electro-mechanical positioning apparatus for accurately positioning a movable part in any one of a plurality of fixed positions, selectively, under the control of electrical switching means.

The invention is particularly useful in random-access magnetic-memory apparatus for high-speed computers. In such apparatus, electric signals representing data that must be "remembered" by the computer are magnetically recorded upon recording surfaces formed on rotating discs, drums, tapes, belts or the like. A number of "records" are recorded side-by-side in parallel recording tracks on each recording surface. Means must be provided for moving the recording and reproducing transducer sideways for positioning the transducer quickly and accurately over any selected one of the side-by-side records.

The positioning must be performed quite accurately; otherwise, the reproduced information may not correspond faithfully to the information that was previously recorded. To make the apparatus useful in a high-speed computer, and to provide quick access to any of the recorded information, it is evident that the positioning mechanism must operate at high speed. It must be controllable by electrical signalling means, preferably equivalent to simple switch operations, so that the computer itself can control the positioning mechanism. Furthermore, since there may be many such devices on a large computer, the positioning mechanism should be simple, compact, highly reliable, and fairly inexpensive. The principal object of this invention is to provide an improved positioning mechanism that satisfies the foregoing requirements.

Briefly stated, the improved positioning mechanism includes a comb-like magnetic core having a plurality of teeth arranged in a row. A coil is wound about each tooth, all of the coils being wound in the same direction and connected in series. Leads are brought out from each connection between adjacent coils and from the free ends of the two end coils. These leads are connected to electrical supply and switching means such that alternating current flows between the two end leads and any selected one of the intermediate leads. Consequently, all of the coils to one side of a selected intermediate lead are energized in phase with one another, and all of the coils on the other side of the selected intermediate lead are energized in an approximately opposite phase.

A magnetic probe, having a width about the same as that of one of the aforesaid teeth, is movable along the length of the comb-like member just out of contact with the ends of the teeth. A coil wound about this probe is in effect a transformer secondary winding, and magnetic flux passing from the comb through the probe induces an alternating voltage within this secondary. The phase of the induced voltage depends upon the position of the probe along the length of the comb-like member relative to the selected intermediate lead that is supplied with alternating current. Whenever the probe is to one side of the selected lead, the induced voltage has one phase, and whenever the probe is to the other side of the selected lead, the induced voltage has approximately the opposite phase. When the probe is positioned precisely midway between the two teeth on opposite sides of the selected lead, a null-balance is obtained and induced voltage is of minimum amplitude.

A conventional servo system is responsive to the voltage induced in the probe winding and operates automatically to position the probe in the null position midway between the two teeth adjacent to the selected intermediate lead that is supplied with alternating current. By a simple electrical switching operation, any one of the intermediate leads can be selected to receive alternating current, and the probe will be moved automatically, quickly, and accurately to a fixed position corresponding to the selected lead. The probe and the magnetic recording and reproducing transducer can be supported on a common movable carriage, so that the automatic positioning of the probe automatically positions the transducer on the recording surface.

The invention will be better understood from the following detailed description taken in connection with the accompanying drawing, and its scope is pointed out in the appended claims. In the drawing:

The single figure is a schematic representation of a positioning mechanism embodying the principles of this invention.

Referring to the drawing, the surface of a rotating drum 1 is coated with any suitable magnetic recording medium to form a magnetic recording surface of a type well-known to those skilled in the art. Instead of a rotating drum, a rotating disc, or moving tape, or belt, or other suitable structure can be employed. A magnetic recording and reproducing transducer 2 is positioned adjacent to the recording surface drum 1 for recording information thereon and reproducing information therefrom in the well-known manner. As long as transducer 2 remains stationary, it records upon or reproduces from a single circular record extending around the circumference of drum 1. Evidently a considerable number of such circular records can be accommodated side-by-side on the surface of drum 1, and transducer 2 can record on and reproduce from any one of these records, selectively, if means is provided for moving transducer 2 sidewise to a plurality of fixed positions selectively. In the memory apparatus of a computer, this arrangement is preferable to having a spiral or helical record such as has been used in conventional sound recording.

For fast access to any of the recorded information, it is necessary that the transducer be quickly movable from any one to any other selected one of a plurality of fixed positions. Such movement should be made under control of simple electrical switching apparatus, or its equivalent, so that the operation can be controlled by the computer itself in accordance with instructions supplied to or derived by the computer. The positioning of transducer 2 must be quite accurate, because the recorded information will not be reproduced faithfully unless the transducer occupies substantially the same position during recording upon a given record and during subsequent reproduction of the recorded information.

Transducer 2 is mounted on a carriage 3 that can be moved sideways or in the axial direction of drum 1, by suitable mechanism such as the lead screw 4 and a two-phase induction motor having a rotor 5 and two windings 6 and 7.

Winding 7 is connected to an A. C. supply through leads 8 and 9, and is constantly energized with alternating current at a fixed or reference phase. Winding 6 is energized by means hereinafter described. Current through winding 6 may either lead or lag, selectively, the phase of the current through winding 7, for rotating rotor 5 in either direction and moving carriage 3 to the right or to the left, selectively.

A comb-like magnetic core 10 is formed from a bar, or a stack of laminations, of iron or other suitable magnetic core material. A plurality of slots are machined into member 10 to form a row of linearly alined teeth, identified in the drawing by reference numbers 11 through 16, of substantially equal widths. A single coil is wound about each of these teeth, as shown. These coils, identified in the drawing by reference numbers 17 through 22, are all wound in the same winding direction and are connected together in series to form a primary winding. The free ends or terminals of the two end coils 17 and 22 are respectively connected through leads 23 and 24 and resistors 25 and 26 to electrical supply lead 9. Intermediate leads, identified by reference numbers 27 through 31, are brought out from each circuit connection between adjacent ones of the coils 17 through 22.

These intermediate leads are connected to respective ones of the fixed contacts 32 through 36 of a multi-position switch having a movable contact 37 that is connected to electrical supply lead 8. The movable contact 37 can be brought into engagement with any selected one of the contacts 32 through 36 for supplying alternating current to any selected one of the intermediate leads 27 through 31. It is evident that all of the coils 17 through 22 that are to one side of the selected intermediate lead are connected in series to the A. C. supply and are energized in the same phase, while all of the coils to the other side of the selected intermediate lead are energized in an approximate opposite phase.

A non-contacting magnetic probe 38 is made of any suitable magnetic core material and has a width approximately equal to that of one tooth of member 10. Probe 38 is attached to and moves with carriage 3, so that as transducer 2 is moved sideways in the axial direction of drum 1, probe 38 moves lengthwise along comb-like member 10, and just clears the ends of teeth 11 through 16. A coil 39 is wound about probe 38 to form a secondary winding in which voltage is induced by magnetic flux linkage with the coils wound on teeth 11 through 16. Whenever probe 38 is to the right of the selected one of intermediate leads 27 through 31, the voltage induced in secondary 39 has one phase relation to the A. C. supply voltage existing between leads 8 and 9, whereas when probe 38 is to the left of the selected intermediate winding the induced voltage has approximately the opposite phase relation to the A. C. supply voltage. When probe 38 is centered midway between the two teeth of member 10 that are adjacent to the selected intermediate lead, the voltage induced in secondary 39 is of minimum amplitude and intermediate phase.

It is evident that the voltage induced in winding 39 is in the nature of an error signal having a phase relation to the supply voltage that indicates the direction in which the carriage must be moved to bring probe 38, and therefore transducer 2, to the selected one of its fixed positions. Therefore the voltage induced in winding 39 can be used to control various well-known servo systems for positioning the carriage and the parts mounted thereon. By way of illustration, the servo system may consist of the lead screw 4, the two-phase induction servo motor 5, 6, 7 and an amplifier 40 connected between probe winding 39 and field winding 6 of the motor.

Except when probe 38 is precisely in the null-balance position, midway between the two teeth adjacent to the selected one of the intermediate leads, the current supplied through motor winding 6 is substantially in phase quadrature to the current supplied through motor winding 7, and the rotor 5 of the motor rotates in one direction or the other depending upon which current is in phase-lagging relation to the other. Whenever probe 38 is positioned to the right of the selected intermediate lead, the motor rotates lead screw 4 in the proper direction to move carriage 3 toward the left. Conversely, whenever probe 38 is to the left of the selected intermediate lead, the motor rotates lead screw 4 in the opposite direction and moves carriage 3 to the right. As probe 38 reaches the null-balance position exactly midway between the two teeth adjacent to the selected intermediate lead, the motor stops and transducer 2 is accurately positioned over a recording track on drum 1.

Whenever access to another recording track is desired, movable contact 37 of the multi-position switch is moved to supply alternating current to a different selected one of the intermediate leads, and the servo system promptly operates to reposition the carriage 3 and thus to bring transducer 2 directly over the newly selected recording track. It will be appreciated that the multi-position switch may be replaced by any other electrical switching means capable of performing an equivalent switching function, and may comprise various parts of a computer.

The positioning mechanism herein described is exceedingly simple, rugged, reliable and economical to manufacture. Positioning with high accuracy is feasible, since the teeth of member 10 can be accurately and closely spaced by machining small slots at precise locations in a bar or a stack of laminations of suitable core material such as transformer iron. A simple servo system can position probe 38 with an accuracy of one-tenth the spacing between the teeth of member 10, or better. The positioning can be controlled by a simple electrical switching means, such as a simple multi-position switch.

It should be understood that this invention in its broader aspects is not limited to the specific embodiment herein illustrated and described, and that the following claims are intended to cover all changes and modifications that do not depart from the true spirit and scope of the invention.

What is claimed is:

1. A positioning mechanism comprising a magnetic core member having a row of teeth, a plurality of coils wound about respective adjacent ones of said teeth, said coils being wound in the same direction and being connected together in series to form a primary winding having two end terminals, a plurality of leads brought out from respective ones of the connections between adjacent ones of the coils, means for supplying electric current between said two end terminals and each of said leads selectively, so that all of said coils to one side of a selected lead are energized in one phase while all of said coils to the other side of said selected lead are energized in an approximately opposite phase, a magnetic probe member movable along and adjacent to said row of teeth, a secondary wound about said probe member so that there is induced in said secondary an alternating voltage that substantially reverses in phase as said probe member is moved from one side to the other of a null position approximately midway between the two teeth adjacent to said selected lead, and means responsive to said voltage for automatically moving said probe member toward said null position.

2. A positioning mechanism comprising a comb-like magnetic core member having a row of linearly alined teeth, a plurality of coils wound about respective adjacent ones of said teeth, said coils being wound in the same winding direction and being connected together in series to form a primary winding having two end terminals, alternating current supply means having first and second electrical supply terminals, two resistors connected between said first supply terminal and respective ones of said two end terminals, a plurality of leads brought out from respective ones of the connections between adjacent ones of said coils, electrical switching means for connecting said second supply terminal to each of said leads selectively, a magnetic probe member movable along and adjacent to said row of teeth, each of said teeth being of a width approximately equal to the width of said probe member, a secondary wound about said probe member so that there is induced in said secondary an alternating voltage that substantially reverses in phase relative to the voltage across said first and second supply terminals as said probe member is moved from one side to the other of a null position approximately midway between the two teeth adjacent to the lead that is connected to said second supply terminal through said switching means, and means responsive to the phase relation between said voltages for automatically moving said probe member toward said null position.

No references cited.